US000001530H

United States Statutory Invention Registration [19]

[11] Reg. Number: H1530

Lee

[45] Published: May 7, 1996

[54] SURFACE EXTRACTION FROM A THREE-DIMENSIONAL DATA SET

[75] Inventor: Ken K. Lee, Los Altos, Calif.

[73] Assignee: Ultrapointe Corporation

[21] Appl. No.: 79,193

[22] Filed: Jun. 17, 1993

[51] Int. Cl.[6] ..... G06F 15/00

[52] U.S. Cl. ..... 395/124; 395/119

[58] Field of Search ..... 395/119, 121, 395/122, 124; 356/301; 382/6

[56] References Cited

U.S. PATENT DOCUMENTS

| | | | |
|---|---|---|---|
| Re. 34,214 | 4/1993 | Carlsson et al. | 358/93 |
| 4,733,063 | 3/1988 | Kimura et al. | 250/201 |
| 4,827,125 | 5/1989 | Goldstein | 250/234 |
| 4,863,226 | 9/1989 | Houpt et al. | 350/6.5 |
| 4,907,174 | 3/1990 | Priem | 395/122 |
| 5,034,613 | 7/1991 | Denk et al. | 250/458.1 |
| 5,035,476 | 7/1991 | Ellis et al. | 350/6.5 |
| 5,091,652 | 2/1992 | Mathies et al. | 250/458.1 |
| 5,117,466 | 5/1992 | Buican et al. | 382/6 |
| 5,122,653 | 6/1992 | Ohki | 250/216 |
| 5,127,730 | 7/1992 | Brelje et al. | 356/318 |
| 5,153,428 | 10/1992 | Ellis | 250/234 |
| 5,162,641 | 11/1992 | Fountain | 250/201 |
| 5,226,113 | 7/1993 | Cline et al. | 395/124 |
| 5,309,550 | 5/1994 | Takahashi | 395/121 |
| 5,313,567 | 5/1994 | Civanlar et al. | 395/124 |
| 5,317,644 | 5/1994 | Kenyon et al. | 382/6 |
| 5,329,352 | 7/1994 | Jacobsen | 356/301 |

*Primary Examiner*—Bernarr E. Gregory

[57] ABSTRACT

Surface image data representing a three-dimensional surface is extracted from a three-dimensional set of data representing characteristics of a volume in space (volumetric data) that encompasses the surface of an object, so that the surface image data can be used to display the surface. The volumetric data can comprise any data set in which comparisons between data can be used to ascertain points on a surface. In one embodiment of the invention, each of the pieces of volumetric data represents the intensity of light reflected in a particular direction from a point in space on or near the surface of an object. For example, the light intensity data can represent the intensity of laser light reflected back through an optical path of a laser imaging system after the laser light has been directed toward the surface of an object such as a semiconductor wafer. The surface image data can be used to generate a three-dimensional display of the surface, or portions of the surface image data can be used to generate surface profiles or contours. Additionally, the surface image data can be used to generate a surface light intensity map.

9 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SURFACE EXTRACTION FROM A THREE-DIMENSIONAL DATA SET

CROSS-REFERENCE TO RELATED APPLICATIONS

This application is related to the commonly owned, co-pending U.S. Patent Application entitled "Laser Imaging System for Semiconductor Inspection and Defect Analysis," by Bruce W. Worster, Dale E. Crane, Hans J. Hansen, Christopher R. Fairley and Ken K. Lee, application Ser. No. 08/080,014, filed on Jun. 17, 1993 and incorporated by reference herein, now U.S. Pat. No. 5,479,252.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

This invention is related to method and apparatus for visually representing a surface that is represented by a three-dimensional set of data.

2. Related Art

In many types of systems, there is a need to ascertain information about one or more physical objects. Consequently, the objects are studied and data regarding the objects is obtained. For instance, three-dimensional data over a volume in space (volumetric data) can be obtained that represents the value of a quantity related to the object. In some light imaging systems, such as, for example, a confocal laser scanning microscopy system, the intensity of reflected light from an object and the object's surroundings yields information regarding properties of that object. For instance, the intensity of reflected light from points on or around the surface of an object is a function of the type of material present at the point at which the light is reflected.

It is desirable to be able to use the volumetric data to ascertain various information regarding the volume of space, i.e., object, being studied. For example, in the light imaging systems, characteristics of the object being imaged that may be of interest are the materials present in various regions of the object or the location of the surface of the object. Consequently, there is a need for methods that use the volumetric data to ascertain the desired information regarding the object.

SUMMARY OF THE INVENTION

According to the invention, surface image data representing a three-dimensional surface is extracted from a three-dimensional set of data representing characteristics of a volume in space (volumetric data) that encompasses the surface of an object, so that the surface image data can be used to display the surface. The volumetric data can comprise any data set in which comparisons between data can be used to ascertain points on a surface.

In one embodiment of the method according to the invention, points on the surface of the object are defined to be the point in the Z-direction at each XY location at which a maximum data value occurs. The volumetric data can be of any type, so long as points on the surface are defined by the location of the maximum data value in the Z-direction at each XY location. The method is equally applicable if the volumetric data is structured such that points on the surface of the object are defined to be the point in the Y-direction at each XZ location at which a maximum data value occurs, or the point in the X-direction at each YZ location at which a maximum data value occurs.

In another embodiment of the invention, each of the pieces of volumetric data represents the intensity of light reflected in a particular direction from a point in space on or near the surface of an object. For example, the light intensity data can represent the intensity of laser light reflected back through an optical path of a confocal laser imaging system after the laser light has been directed toward the surface of an object such as a semiconductor wafer.

The surface image data can be used to generate a three-dimensional display of the surface, or portions of the surface data can be used to generate surface profiles or contours. Additionally, the surface image data can be used to generate a surface light intensity map.

DETAILED DESCRIPTION OF EMBODIMENTS OF THE INVENTION

According to the invention, surface image data representing a three-dimensional surface is extracted from a three-dimensional set of data representing characteristics of a volume in space (volumetric data) that encompasses the surface of an object, so that the surface image data can be used to display the surface. The volumetric data can comprise any data set in which comparisons between data can be used to ascertain points on a surface.

In one embodiment of the invention, each of the pieces of volumetric data represents the intensity of light reflected in a particular direction from a point in space on or near the surface of an object. For example, the light intensity data can represent the intensity of laser light reflected back through an optical path of a confocal laser imaging system after the laser light has been directed toward the surface of an object such as a semiconductor wafer. Such a system is described in commonly owned, co-pending U.S. Patent Application entitled "Laser Imaging System for Semiconductor Inspection and Defect Analysis," by Bruce W. Worster, Dale E.

Crane, Hans J. Hansen, Christopher R. Fairley, Ken K. Lee, application Ser. No. 08/080,014, filed on Jun. 17, 1993, the pertinent disclosure of which is hereby incorporated by reference, now U.S. Pat. No. 5,479,252.

Figure 1:
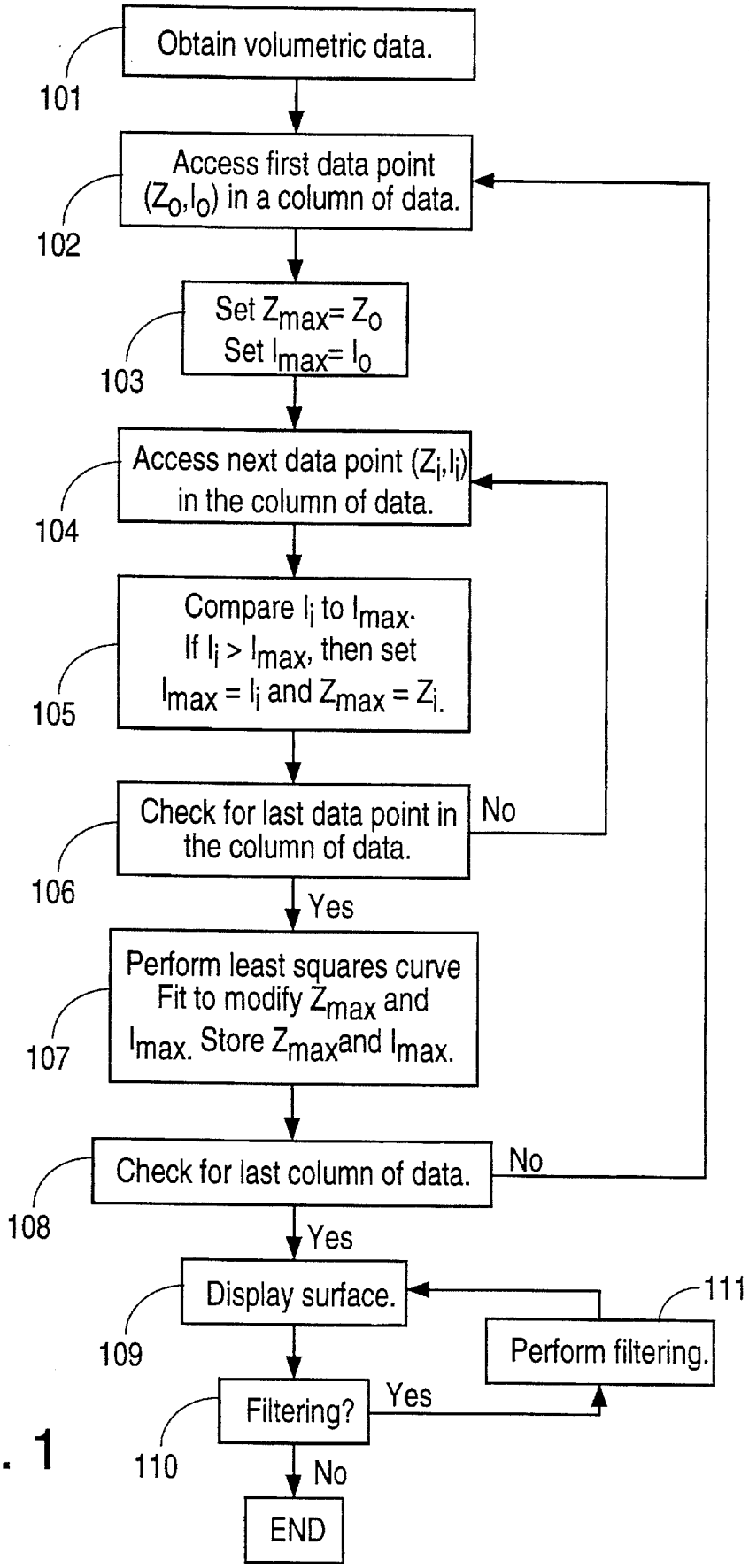
FIG. 1 is a block diagram illustrating a method according to the invention for extracting surface image data representing a three-dimensional surface from a set of volumetric data so that the surface image data can be used to display the surface.

FIG. 1 is a block diagram illustrating a method according to the invention for extracting surface image data representing a three-dimensional surface from a set of volumetric data so that the surface image data can be used to display the surface. As shown by block 101 in FIG. 1, the volumetric data is obtained by any appropriate data acquisition structure using any appropriate method. The method will often depend upon the data acquisition structure and type of surface (e.g., surface of semiconductor wafer) and the type of data (e.g., light intensity). In one embodiment, after the volumetric data is obtained, the volumetric data is stored as an array of data in a non-volatile storage medium such as a disk drive, such as is available from Silicon Graphics in Mountain View, Calif. as part no. P3-F252. When the method according to the invention is to be performed, the volumetric data and the array size data are transferred from the non-volatile storage medium to a structure for processing the data, such as a microprocessor. The data is transferred to the structure for processing by a diskette or other media, or by communication via a link or network such as Ethernet, RS232, etc. Alternatively, the volumetric data and array size data can be transferred to a RAM, then accessed from the RAM by the structure for processing data. Or, the volumetric data can be input to the RAM directly from the data acquisition structure, then transferred to the structure for processing.

Figure 2:
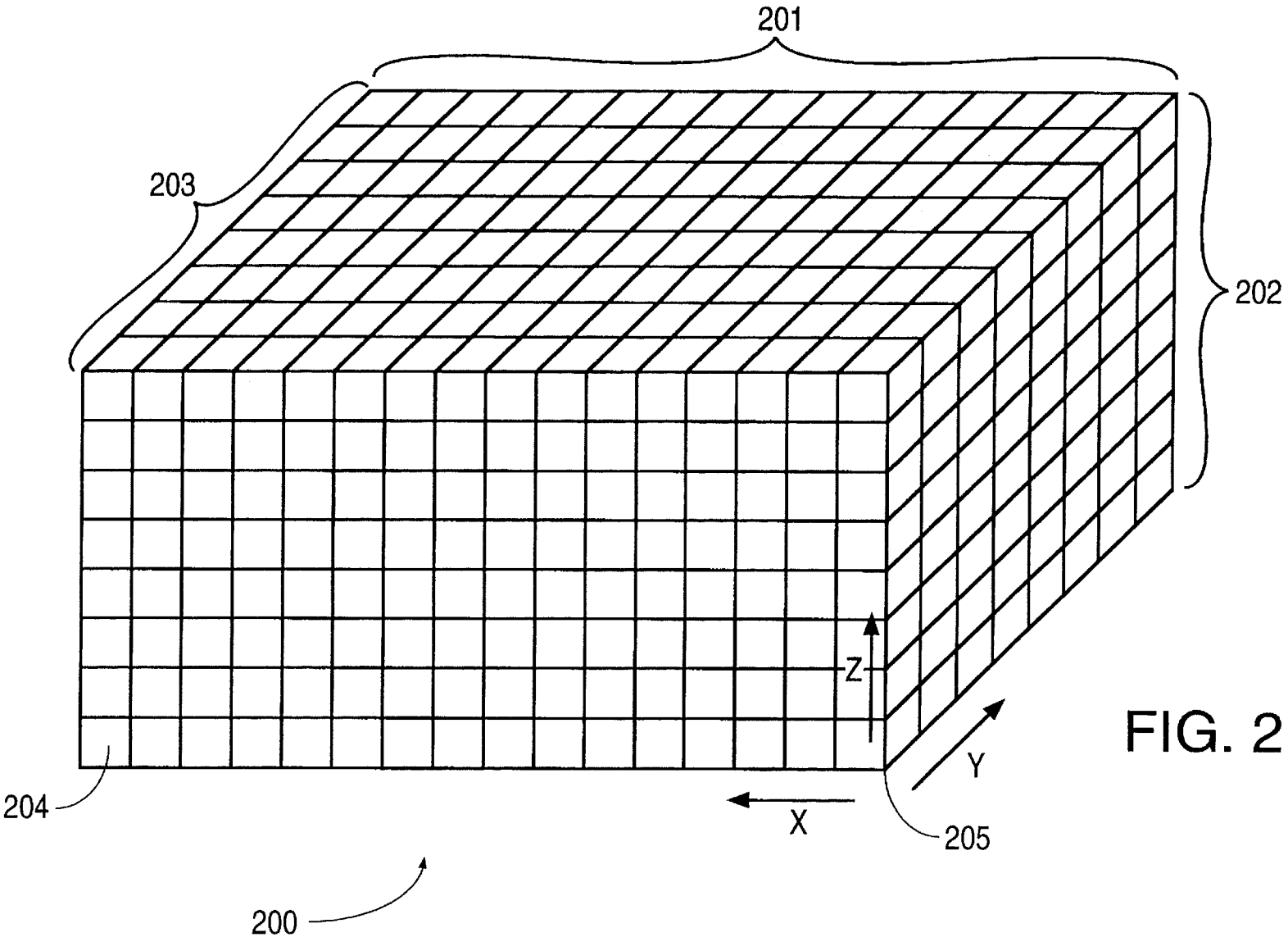
FIG. 2 is a schematic representation of a volumetric data set for use with the invention.

The volumetric data is stored in a three-dimensional array. FIG. 2 is a schematic representation of volumetric data set 200 for use with the invention. Each data block, e.g., data block 204, of volumetric data set 200 represents one piece of data. The size of volumetric data set 200 is defined by dimensions 201, 202 and 203. The dimensions shown in FIG. 2 are merely illustrative; generally, a volumetric data set for use with the invention can have any dimensions. For instance, the dimensions 201 and 203 can be 256, 512, or 1024, and the dimension 202 can range from 10 to 128.

In one embodiment of the invention, each dimension 201, 202, 203 of volumetric data set 200 corresponds to a spatial dimension measured along, for instance, an axis of a Cartesian coordinate system, e.g., dimension 201 corresponds to the X-axis dimension of the volume of space for which data is obtained, dimension 203 corresponds to the Y-axis dimension, and dimension 202 corresponds to the Z-axis dimensions. For example, where the data represents reflected light intensities from points on or near the surface, each data block, e.g., data block 204, of volumetric data set 200 represents a reflected light intensity at a particular point in space relative to the origin of a Cartesian coordinate system. In the case, for example, where the data represents the intensity of laser light reflected back through an optical path of a laser imaging system after the laser light has been directed toward the surface of an object such as a semiconductor wafer, the X and Y axes of the Cartesian coordinate system define a plane approximately perpendicular to the surface on which the wafer is mounted, and the Z axis corresponds to the height of the data point with respect to the mounting surface. For example, the origin of the Cartesian coordinate system may be defined to be at the center of the surface on which the wafer is mounted. In that case, each piece of volumetric data represents the light intensity at a point in space that is defined with respect to the center of the wafer mounting surface.

In volumetric data set 200, the origin is defined to be at data block 205, though any data block could have been chosen. Each of the remaining data blocks, e.g., data block 204, represents a data point taken at a particular distance from the origin; the exact distance will be a function of the size of the volume for which data is obtained and the number of data blocks, e.g., data points, in volumetric data set 200.

In the embodiment of the method according to the invention shown in FIG. 1, points on the surface of the object are defined to be the point in the Z-direction at each XY location at which the maximum data value occurs. In the remainder of the description, the data will be assumed to be light intensity measurements. It is to be understood that the method of the invention is equally applicable when the volumetric data is of another type (i.e., something other than light intensity), so long as points on the surface are defined by the location of the maximum data value in the Z-direction at each XY location. Further, the method of the invention is equally applicable if the volumetric data is structured such that points on the surface of the object are defined to be the point in the Y-direction at each XZ location at which the maximum data value occurs, or the point in the X-direction at each YZ location at which the maximum data value occurs.

As shown by block 102, after the data, e.g., volumetric data set 200, is obtained, the first data point in a column (Z-axis) of data is accessed, e.g., data block 205. Each data point is a light intensity. Additionally, with each data point is associated an XYZ location, the exact location being determined as a function of the definition of the origin of the coordinate system associated with the physical volume for which data was obtained, the size of volumetric data set 200, and the size of the physical volume for which data was obtained. Thus, four numerical values are associated with and stored for each data block, e.g., data block 205, in volumetric data set 200: the X, Y and Z coordinates of the location of the data point and the intensity value measured at the location of the data point. Herein, the data associated with the first data point in each column will be designated $X_0$ (X-coordinate location), $Y_0$ (Y-coordinate location), $Z_0$ (Z-coordinate location), and $I_0$ (light intensity value). Data associated with a generic data point will be designated $X_i$, $Y_i$, $Z_i$, and $I_i$.

As shown by block 103, after the first data point in the column is accessed, the quantity $Z_{max}$ is set equal to $Z_0$ and the quantity $I_{max}$ is set equal to $I_0$ (i.e., $Z_{max}$ and $I_{max}$ are "initialized"). $Z_{max}$ and $I_{max}$ represent the location of the maximum light intensity in a particular column and the value of the maximum light intensity in the particular column, respectively. It is these values, determined for each column of data in volumetric data set 200, that will be used to create the three-dimensional display of the surface.

As shown by block 104, after initializing $Z_{max}$ and $I_{max}$, the next data point in the column is accessed. The data associated with each data point 'i' is $X_i$ (X-coordinate location), $Y_i$ (Y-coordinate location), $Z_i$ (Z-coordinate location), and $I_i$ (light intensity value). Generally, the data can be accessed in any order within a column, so long as each data point in the column is accessed once and only once.

After accessing the data at data point 'i', the light intensity data, $I_i$, at data point 'i' is compared to $I_{max}$, as shown by block 105. If $I_i$ is greater than $I_{max}$, then $I_{max}$ is set equal to $I_i$ and $Z_{max}$ is set equal to $Z_i$.

As shown by block 106, after comparing $I_i$ to $I_{max}$, a check is made for whether the last data point in the column of data has been reached. If the last data point in the column has not been reached, then, as shown by block 104, a new data point, i, is accessed and, as shown by block 105, the light intensity, $I_i$ is compared to the currently stored maximum light intensity, $I_{max}$. These comparisons continue until each data point in the column of data has been compared to $I_{max}$. When all data points have been compared to $I_{max}$, a new column of data is analyzed, as described below.

It is to be understood that the columns of data can be analyzed, i.e., the method steps described by blocks 102, 103, 104, 105 and 106 applied, in any order. Thus, the first column analyzed need not necessarily be located at a corner edge of volumetric data set 200, but, rather, can be located anywhere within volumetric data set 200.

If the last data point in a column has been reached, then, as shown by block 107, a least squares quadratic curve fit is performed, as described in more detail below. The least-squares curve fit is used to refine the identification of the value of the light intensity maximum, $I_{max}$ and the location of the light intensity maximum, $Z_{max}$. The new values of $I_{max}$ and $Z_{max}$ determined through the least-squares quadratic curve fit are then stored as $I_{max}$ and $Z_{max}$.

It is to be understood that the performance of a least-squares quadratic curve fit, as shown by block 107, is not a necessary part of the method according to the invention. Extraction of surface image data from a volumetric data set can be performed without performing a least-squares quadratic curve fit. However, the least-squares quadratic curve fit is desirable to enhance the accuracy of the surface image representation and to smooth out spurious spikes in the data that may result from, for example, noise attributable to the system which acquired the volumetric data.

The least-squares quadratic curve fit is applied to each column of data points using a subset of the data points in each column. After $Z_{max}$ and $I_{max}$ are found for each column, a set of adjacent data points, centered about the data point at which $Z_{max}$ and $I_{max}$ occurred, is used to perform a conventional least-squares quadratic curve fit. Any odd number of data points can be chosen; in alternative embodiments, 7 and 15 data points are chosen. The number of data points chosen to do the curve fit involves a tradeoff. As the number of points increases, the accuracy of the curve fit increases; however, the time to perform the curve fit also increases. The number of data points used in the least-squares quadratic curve fit is pre-specified as part of the method according to the invention; the user can not choose this parameter.

In some cases, $Z_{max}$ and $I_{max}$ can occur for a data point ("maximum data point") near the beginning or end of a column of data such that insufficient actual data points exist on one or the other sides of the maximum data point. For example, if 7 points are used in the least-squares quadratic curve fit, and the maximum data point is at the end of a column, then, while there would be three data points on one side of the maximum data point for use in the curve fit, there would be not be three data points (in fact, there would be no data points) on the other side of the maximum data point for use in the curve fit. In such a case, "dummy" data points are substituted for the missing data points. The value of light intensity for the dummy data points is set equal to the value of light intensity at the last (beginning or end) data point in the column. In the above example, each dummy data point would be assigned a light intensity value equal to the light intensity value at the maximum data point. The curve fit then proceeds in the normal fashion.

Generally, each data point in the volumetric data set is represented as an 8-bit quantity. All data calculations (e.g., a light intensity maximum modified using the least-squares quadratic curve fit) are floating point calculations. The result of each calculation is, initially, represented as a floating point number, e.g. 32-bit floating point number. In order to save data storage capacity, in one embodiment of the invention, the floating point number is converted back to an 8-bit number, thus sacrificing some of the resolution (accuracy) inherent in the floating point representation. However, representing data as an 8-bit number may not provide adequate resolution for some surfaces, e.g., surfaces that are generally very flat.

In an alternative embodiment of the invention, where more resolution is necessary or desired, the data can be stored as a 32-bit floating point number. Rather than storing the result of a calculation, e.g., the light intensity maximum resulting from the least-squares quadratic curve fit, as an 8-bit quantity, as would normally be done, the result of the calculation can be left as a floating point number, thus increasing the resolution of the light intensity maximums found by the method according to the invention.

After the least-squares quadratic curve fit, as shown by block 108, a check is made for whether the last column of data has been reached or not. If the last column of data has not been reached, then determination of $I_{max}$ and $Z_{max}$ for a new column of data begins again. The first data point of the new column is accessed, as shown by block 102, and the method described above is used to determine $I_{max}$ and $Z_{max}$ for the new column of data.

If the last column of data has been reached, then the surface is displayed, as shown by block 109. The set of maximum light intensity values and the corresponding set of locations of the maximum light intensity values are used to create a three-dimensional image representing the surface of the object.

The location of the points on the surface, i.e., the shape of the surface, is determined by the stored $Z_{max}$ values. The surface image can be displayed without color (i.e., only the $Z_{max}$ data is used), or the surface can be shaded as a function of the $Z_{max}$ values. The intensity ($I_{max}$) data can be used with the $Z_{max}$ data to shade (gray-scale) or false color the points on the surface, each shade or color representing the type of material present at that part of the surface.

Figure 3A:
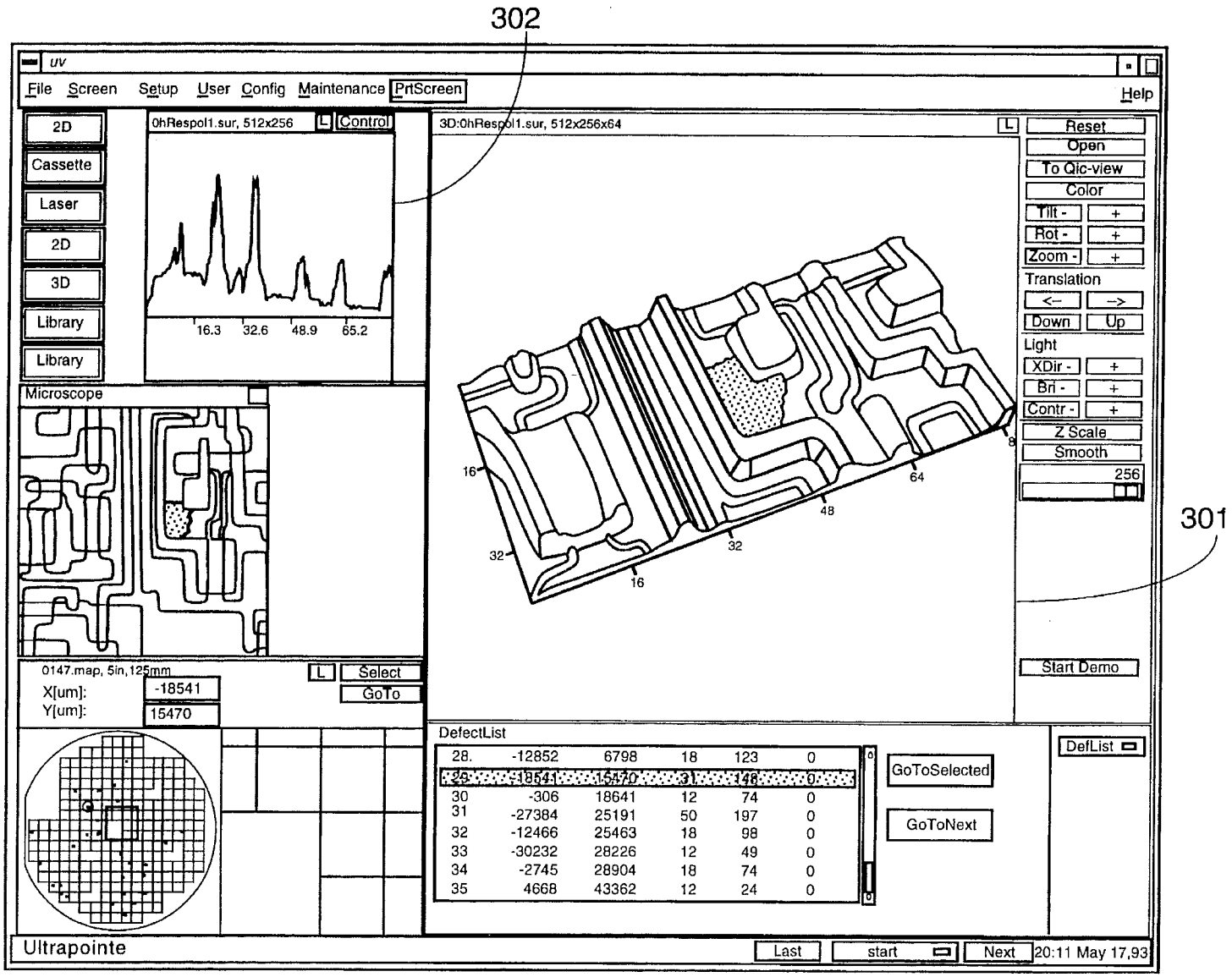
FIG. 3A is a view of a display screen including a window showing a three-dimensional surface image obtained by using the method according to the invention and a surface profile obtained by specifying an XZ cut through the surface image data.

FIG. 3A is a view of a display screen including window 301 showing a three-dimensional surface image obtained by using the method according to the invention.

In addition to display of a three-dimensional surface, the surface data can be used to display either surface contours or profiles, i.e., two-dimensional displays viewed perpendicularly to a specified cut through the surface data, e.g., an XY cut, an XZ cut, a YZ cut. In FIG. 3A, window 302 shows a surface profile obtained by specifying an XZ cut through the surface image data.

Figure 3B:
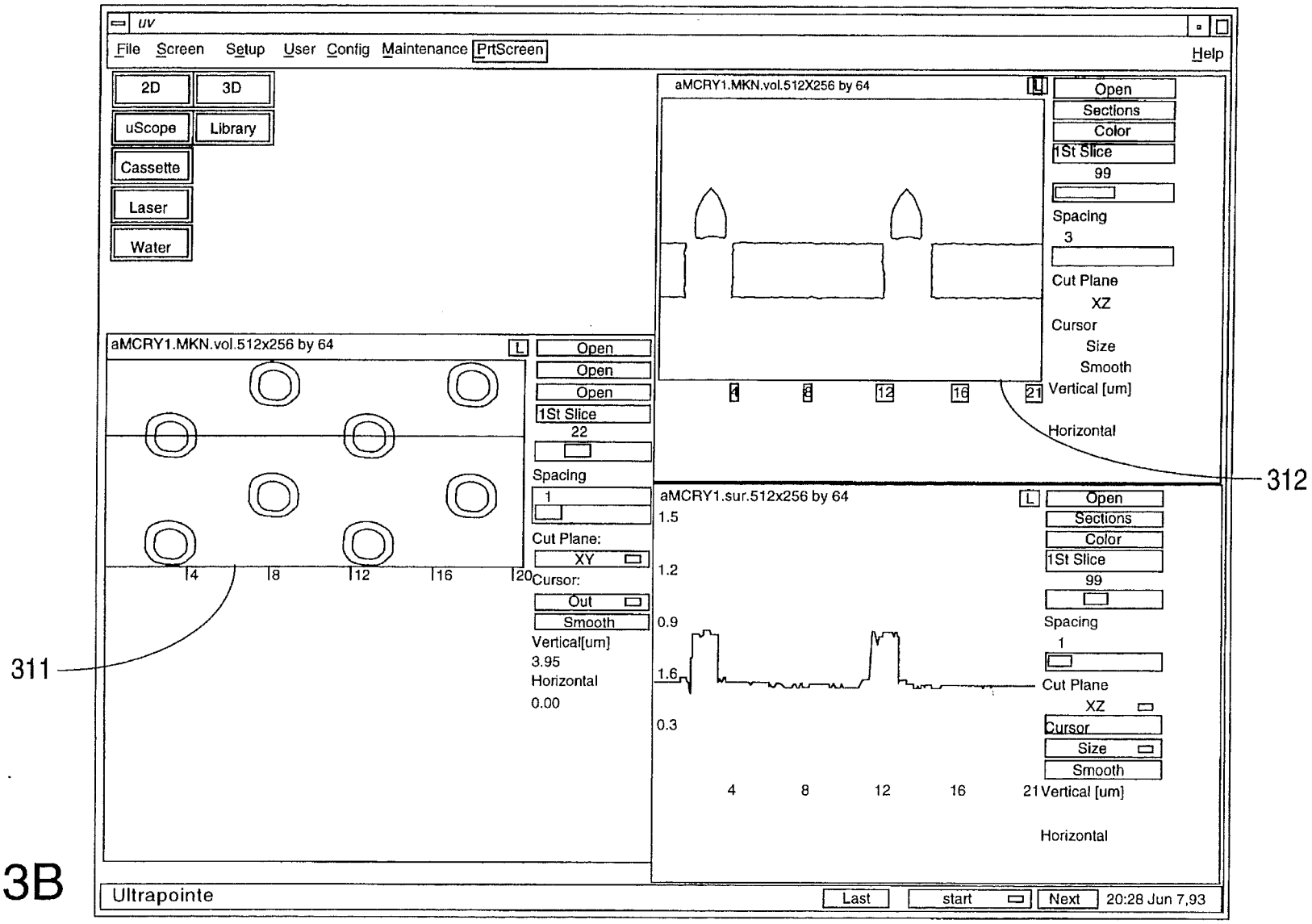
FIG. 3B is a view of a display screen including windows showing two-dimensional intensity slices obtained by specifying an XY and XZ cut, respectively, through surface image data.

Two-dimensional views can also be used to display "intensity slices." FIG. 3B is a view of a display screen including windows 311 and 312 showing two-dimensional intensity slices obtained by specifying an XY and XZ cut, respectively, through the surface image data.

The surface data can be displayed on any conventional computer monitor with graphical capability, preferably a system with high resolution 24-bit color graphics.

After the surface image is displayed, the user, based upon a visual inspection of the displayed surface image, decides whether or not to apply filtering to the surface image display, as shown by block 110. Filtering may be necessary to smooth out spikes that result from noise contamination of the volumetric data. Filtering would likely be desirable, for instance, if there were a large number of spikes in the surface image displayed at block 109. If filtering is desired, then filtering is applied to the surface image data, as shown by block 111, and as explained in more detail below. After filtering, the surface image is displayed again (block 109). The user again decides whether or not to apply filtering to the surface image display (block 110). The user can choose to perform filtering as often as desired. The effect of filtering is cumulative so that as the amount of filtering increases the image becomes smoother and smoother. Too much filtering may result in creating an erroneous surface image display by smoothing out actual peaks and valleys on the surface. Whenever the user decides not to apply filtering to the surface image display, the method ends and the last displayed image is the surface image produced by the method.

The filter used in block 110 is a conventional two-dimensional low-pass or smoothing filter that performs a two dimensional convolution with a 3 by 3 operator. If filtering is selected, then filtering is performed over the entire surface. The filtering is accomplished by applying a 3 by 3 matrix to each data point on the surface. The 3 by 3 matrix used is shown below:

$$\begin{matrix} 1 & 1 & 1 \\ 1 & x & 1 \\ 1 & 1 & 1 \end{matrix}$$

where x is some number greater than 1. The larger x is, the less filtering is accomplished. 'x' is a parameter that is pre-specified as part of the method according to the invention; the user cannot select this or any other filtering parameter; the user may only choose whether or not to do filtering. The value of 'x' is determined empirically so that the filter will produce some noticeable smoothing, but not so much that actual peaks and valleys are smoothed out.

The 3 by 3 matrix is centered on each point of the surface, in turn. Each value of the matrix multiplies the corresponding light intensity value for the points on the surface surrounding the data point being filtered. The sum of these multiplications is then divided by the sum of the numbers in the filtering array, i.e., 8+x, to arrive at an averaged intensity value that is substituted for the measured intensity value of the data point being filtered. As noted above, each point on the surface is filtered in this way. In order that previously filtered data points do not affect the filtering of subsequent data points, a temporary array is created to hold the filtered values. At the end of filtering, the temporary array replaces the original image data.

At the edges and corners of the display, where actual light intensity values do not exist for use with the filtering matrix, "dummy" data points are substituted. The dummy values are set equal to the light intensity value of the nearest adjacent actual data point, and filtering is performed as described above.

Alternatively, as also noted above, the three-dimensional data can be successively obtained sets of two-dimensional data that, together, form a three-dimensional data set. Each two-dimensional set of data is of the same size (i.e., the same numbers of rows and columns) and each piece of data in each of the two-dimensional sets of data has a corresponding piece of data in each of the other two-dimensional sets of data. In this case, the method according to the invention is modified slightly from the block diagram shown in FIG. 1.

Figure 4:
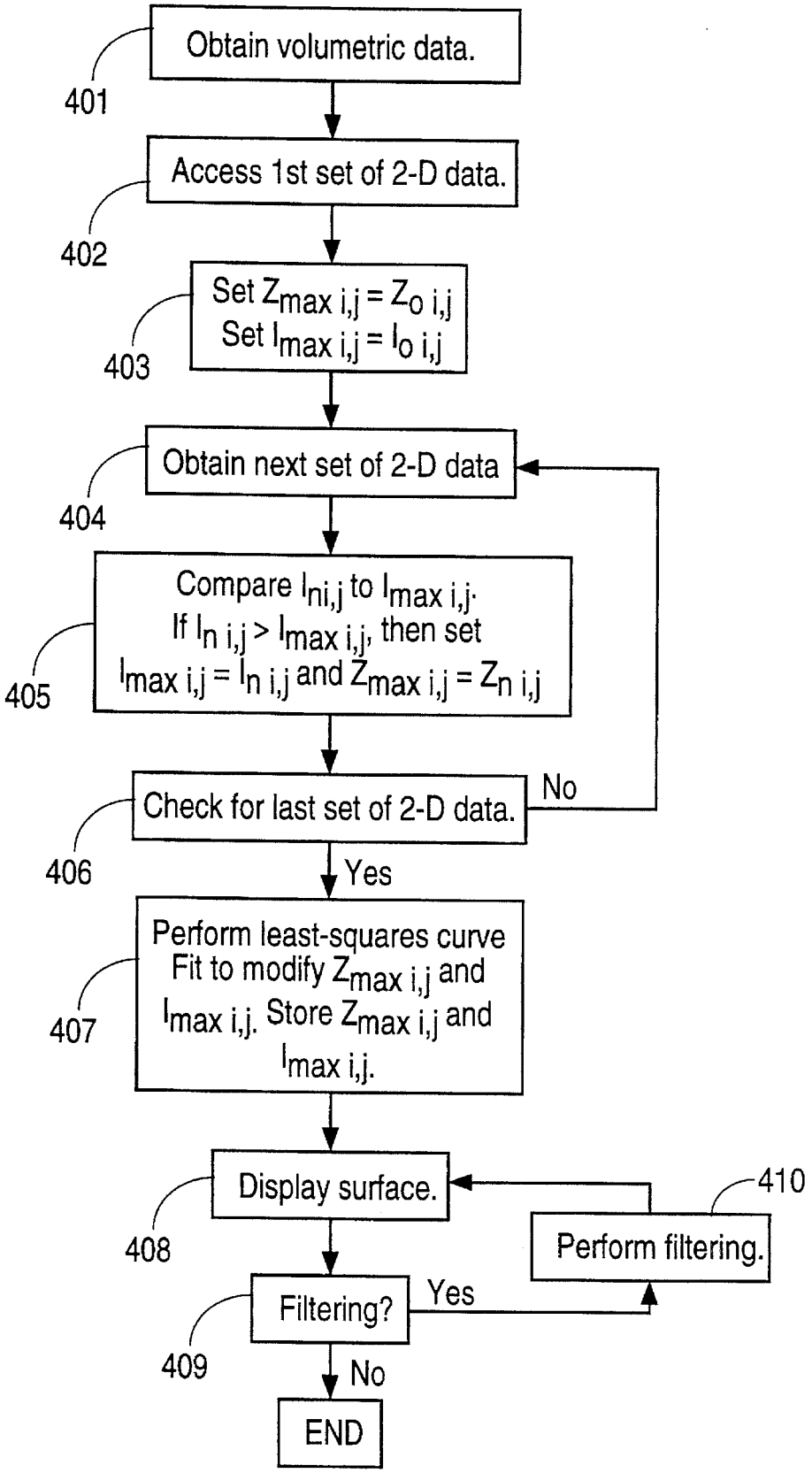
FIG. 4 is a block diagram illustrating a method according to another embodiment of the invention for extracting surface image data representing a three-dimensional surface from a set of volumetric data so that the surface image data can be used to display the surface.

FIG. 4 is a block diagram illustrating a method according to another embodiment of the invention for extracting surface image data representing a three-dimensional surface from a set of volumetric data so that the surface image data can be used to display the surface. As in the embodiment described with respect to FIG. 1, the method according to this embodiment of the invention is applied to an existing three-dimensional set of data that is stored on a non-volatile storage medium or temporary storage such as a RAM.

As shown by block 401, the volumetric data is obtained by any appropriate method, as described above with respect to FIG. 1, and stored in a three-dimensional array as shown in FIG. 2. The volumetric data being used by methods described with respect to FIGS. 1 and 4 is the same.

As shown by block 402, after the data, e.g., volumetric data set 200, is obtained, rather than accessing the first data point in a column, as in FIG. 1, a two-dimensional set of data (XY data) is accessed. Hereafter, the data associated with each data point in the two-dimensional set of data is designated generally as $X_{ni,j}$ (X-coordinate location), $Y_{ni,j}$ (Y-coordinate location), $Z_{ni,j}$ (Z-coordinate location), and $I_{ni,j}$ (light intensity value). In the simple case where data in the z direction are spaced regularly by a scaling factor, then $Z_{ni,j}$ is equal to n times the scaling factor.

As shown by block 403, after the first two-dimensional set of data is accessed, as shown by block 402, the quantities $Z_{maxij}$ are set equal to $Z_{Oi,j}$ and the quantities $I_{maxi,j}$ are set equal to $I_{Oi,j}$ (i.e., $Z_{maxi,j}$ and $I_{maxi,j}$ are "initialized"). $Z_{maxi,j}$ and $I_{maxi,j}$ represent the locations of the maximum light intensity in each column and the value of the maximum light intensity in each column, respectively, i.e., the values that will be used to create the three-dimensional display of the surface.

As shown by block 404, after initializing $Z_{maxi,j}$ and $I_{maxi,j}$, the next two-dimensional set of data is accessed.

As shown by block 405, after accessing the data at the data points '$n_{i,j}$', the light intensity data, $I_{ni,j}$, at data points '$n_{i,j}$' are compared to the $I_{maxi,j}$ values. If $I_{ni,j}$ is greater than $I_{maxi,j}$, then $I_{maxi,j}$ is set equal to $I_{ni,j}$ and $Z_{maxi,j}$ is set equal to $Zn_{i,j}$.

As shown by block 406, after comparing $I_{ni,j}$ to $I_{maxi,j}$, a check is made for whether the last two-dimensional set of data has been reached. If the last two-dimensional set of data has not been reached, then, as shown by block 404, a new set of data points, ni,j, is accessed and, as shown by block 405, the light intensity values, $I_{ni,j}$ are compared to the currently stored maximum light intensity values, $I_{maxi,j}$. These comparisons continue until each two-dimensional set of data has been compared to the $I_{maxi,j}$ values.

It is to be understood that the two-dimensional sets of data can be analyzed, i.e., the method steps described by blocks 402, 403, 404, 405 and 406 applied, in any order. Thus, the first two-dimensional set of data analyzed need not necessarily be located at the top or bottom of volumetric data set 200, but, rather, can be located anywhere within volumetric data set 200. Further, successive two-dimensional sets of data need not necessarily be adjacent each other in space.

As shown by block 407, when all two-dimensional sets of data have been compared to the $I_{maxi,j}$ values, a least-squares quadratic curve fit is performed to modify the $Z_{maxi,j}$ and $I_{maxi,j}$ values, as shown by block 407. A least-squares quadratic curve fit is performed on each column of data, exactly as with respect to FIG. 1. The newly determined values of $I_{maxi,j}$ and $Z_{maxi,j}$ determined through the least-squares quadratic curve fit are then stored as $I_{maxi,j}$ and $Z_{maxi,j}$. As with the method of FIG. 1, it is to be understood that the performance of a least-squares quadratic curve fit, as shown by block 407, is not a necessary part of the method according to the invention, but is desirable to enhance the accuracy of the surface image representation and to smooth out spurious spikes in the data.

After the least-squares quadratic curve fit, the surface is displayed, as shown by block 408. After the surface image is displayed, the user decides whether or not to apply filtering to the surface image display, as shown by block 409. If filtering is desired, then filtering is applied to the surface image data, as shown by block 410. The display and filtering are the same as described above with respect to FIG. 1. After filtering, the surface image is displayed again (block 409). The user again decides whether or not to apply filtering to the surface image display (block 410). As above, the user can choose to perform filtering as often as desired. Whenever the user decides not to apply filtering to the surface image display, the method ends and the last displayed image is the surface image produced by the method.

The method according to the invention can be implemented with any appropriate structure. For example, the method according to the invention can generally be implemented by any computer acting together with a compatible data acquisition system. In one embodiment, the method according to the invention is implemented on a computer made by Silicon Graphics in Mountain View, Calif. and available as part no. SGI XS24Z, using data obtained by a laser imaging system as described in commonly owned, co-pending U.S. Patent Application entitled "Laser Imaging System for Semiconductor Inspection and Defect Analysis," by Bruce W. Worster, Dale E. Crane, Hans J. Hansen, Christopher R. Fairley and Ken K. Lee, application Ser. No. 08/080,014, filed on Jun. 17, 1993, the pertinent disclosure of which is hereby incorporated by reference, now U.S. Pat. No. 5,479,252.

If the method according to the invention is implemented on a computer, the method can be represented in any suitable computer code. In one embodiment according to the invention, the method is represented in computer code written in the C language. Appendix A is a computer code listing embodying the method according to the invention described with respect to FIG. 4 and is herein incorporated by reference.

Various embodiments of the invention have been described. The descriptions are intended to be illustrative, and not limiting. Thus, it will be apparent to one skilled in the art that certain modifications may be made to the invention as described without departing from the scope of the claims set out below.

APPENDIX A

A Computer Code Listing of
a Method for Extracting a Surface Image
from a Three-Dimensional Data Set © 1993 by Ultrapointe Corp. unpublished

APPENDIX A

```
#include <stdio.h>
#include <stdlib.h>
#include <math.h>
#include <time.h>
#include <X11/Intrinsic.h>                /* TRUE /FALSE */
#include <gl/gl.h>      /* matrix */
/*#include "semaphor.h"  */
#include "uv_util.h"
#include "wfrfile.h"
#include "uv_data.h"
#include "uv_file.h"
#include "uvconfig.h"
#include "gx.h"
#include "surface.h"
#define PC_VOL_TAILER_LENG 10 /* unsigned int DataTime;
     short     Zres;
     short     ZoomFactor;
     short     ScanMode;
     */
#define MAX_LINE_LENG 1024
#define DEFAULT_Z 127
static float fNormalBack[]  = {  0, 1, 0}; /* unit vector
     pointing back */
static float fNormalFront[] = {  0, -1, 0}; /* unit vector
     pointing front */
static float fNormalRight[] = {  1, 0, 0};
static float fNormalLeft[]  = { -1, 0, 0};
static int Get3Lines( BYTE *bBuff, BYTE **bLine0, BYTE
     **bLine1,BYTE **bLine2,
     int iX, int iY, int iYIndex );
static int surSmoothSurface( int iXDim, int iYDim, BYTE
     *bPtr);
static int surQuadCurveFit( BYTE *bPtr0, BYTE *bPtr1, BYTE
     *bPtr2,BYTE *bPtr3, BYTE *bPtr4, BYTE *bZPtr,
     int iSize, int Threshold);
static int GetNormal2( float *n, BYTE *DataArray, BYTE
     *DataPtr2, int iX);
static BOOL  surReadAsciiSurfaceFile(SURFACE_WIN_PARMS
     *SurfParms, FILE *Fptr);
static BOOL surTransferSurfFile2SurfParms(
BINARY_SURFACE_FILE *SurfFile, SURFACE_WIN_PARMS
     *SurfParms );
static int surHistogram(int *Histogram, BYTE *Intensity,
     int iSize);
static int surLinearInterpolate( int iLoZ, int iHiZ, int
     iLodX, int ihidX);
static BYTE surInterpolate( int XDim, int YDim, int iX,
     int iY, BYTE *ZLine, BYTE *ILine);
static BOOL surComputeMax( BYTE *PtrD, BYTE *PtrN, BYTE
     *PtrZ, BYTE *PtrMin, int iSize, BYTE ZVal, int
     iZStart);
```

```
static BOOL surDoThreshold( BYTE *PtrZ, BYTE *PtrN, BYTE
     *PtrMin, int iSize, int Threshold);
static BOOL  surEnhanceSurface( SURFACE_WIN_PARMS
     *SurfParms);
static BOOL surPeakFit( VOLUME_DATA *VolData, int XDim,
     int YDim, int ZDim, SURFACE_WIN_PARMS *SurfParms);
extern int sur_ReadInNewData( SURFACE_WIN_PARMS
     *SurfParms, FILE *Fptr)
     {
     int   iXlocal, iYlocal, iZlocal, iSize;
     BOOL   rt = FALSE;
     UVDATA_TYPE eDaType;
     IMAGE_DATA_SPEC     *ImgSpec; /* filename,dim,date */
     UV_FILE_HEADER  Header;
          /* '\0' replaces '\n' */
          eDaType = fi_CheckFileSignature( Fptr,
               Header.Signature);
          ImgSpec = &(SurfParms->ImgSpec);
          switch ( eDaType)
               {
       case eSurfDataType:
          case eBinSurfDataType:
                    rt = sur_ReadUVSurfaceFile( SurfParms,
                         Fptr, eDaType);
                    if( rt == TRUE)
                         {
                         iSize = ImgSpec->iXDim *
                         ImgSpec->iYDim;
                         sur_FillNormalArray(
                              SurfParms->DataArray,
                              SurfParms->NormalArray,
                              ImgSpec->iXDim,
                              ImgSpec->iYDim);
                         memcpy(
                              SurfParms->WorkingIntensity,
                              SurfParms->Intensity,
                              iSize);
                         }
               break;
               case eUndefined:
/* old volume file. Historic  interest */
                    iXlocal =
                    fi_IntelShortSwap(Header.sHeader[0]) ;
                    iYlocal =
                    fi_IntelShortSwap(Header.sHeader[1]) ;
                    iZlocal =
                    fi_IntelShortSwap(Header.sHeader[2]) ;
                    iSize = iXlocal * iYlocal ;
                    if( iSize < MAX_ARRAY_SIZE)
                         {
                         sur_GenerateNonFittedSurface(
                              Fptr,NULL, iXlocal,
                              iYlocal,iZlocal, SurfParms,
```

```
                                0);
                            ImgSpec->iXDim  = iXlocal;
                            ImgSpec->iYDim  = iYlocal;
                            ImgSpec->iZDim  = (iZlocal< 2)?
                            127: iZlocal;
                            surEnhanceSurface( SurfParms);
                            memcpy(
                                SurfParms->WorkingIntensity,
                                SurfParms->Intensity,
                                iSize);
                            sur_FillNormalArray(
                                SurfParms->DataArray,
                                SurfParms->NormalArray,
                                iXlocal, iYlocal);
                            SurfParms->ActualThres =
                            SurfParms->Threshold;
                            SurfParms->bEnhanced   =
                            SurfParms->bEnhance;
                            SurfParms->bZFitted    =
                            SurfParms->bZCurFit;
                            rt = TRUE;
                            }
                        break;
                        }
                    return rt;
                    }
/*********************************************
 * convert stored Volume data into surface data
 ***************************************************
 */
extern int sur_VolToSur(GLOBAL_DATA  *UVData,
     SURFACE_WIN_PARMS *SurfParms)
     {
     int  rt=FALSE,iSize;
     IMAGE_DATA_SPEC     *ImgSpec; /* filename,dim,date */
     VOLUME_DATA *VolData = &(UVData->VolData);
     ImgSpec = &VolData->ImgSpec;
     iSize = ImgSpec->iXDim * ImgSpec->iYDim ;
     if( iSize < MAX_ARRAY_SIZE)
          {
          SurfParms->Threshold = VolData->Threshold;
          SurfParms->bEnhance  = VolData->bEnchance;
          SurfParms->bZCurFit  = VolData->bZCurFit;
          memcpy( &SurfParms->ImgSpec, ImgSpec,
               sizeof(IMAGE_DATA_SPEC) );
          sur_GenerateNonFittedSurface(NULL, VolData,
               ImgSpec->iXDim, ImgSpec->iYDim,
               ImgSpec->iZDim , SurfParms, 0);
     surEnhanceSurface( SurfParms);
          memcpy( SurfParms->WorkingIntensity,
               SurfParms->Intensity, iSize);
          sur_FillNormalArray( SurfParms->DataArray,
               SurfParms->NormalArray,
```

```
            ImgSpec->iXDim,ImgSpec->iYDim);
        SurfParms->ActualThres = SurfParms->Threshold;
        SurfParms->bEnhanced   = SurfParms->bEnhance;
        SurfParms->bZFitted    = SurfParms->bZCurFit;
        rt = TRUE;
            }
        return rt;
        }
/*****************************************************
 * read data file from disk,
 * uv signature already been striped
 *
 ****************************************************
 */
      extern BOOL sur_ReadUVSurfaceFile(SURFACE_WIN_PARMS
            *SurfParms, FILE *Fptr, UVDATA_TYPE eDataType)
      {
      BOOL    rt = FALSE;
      BINARY_SURFACE_FILE SurfFile;
      int    iSize ;
      switch(eDataType)
         {
         case eBinSurfDataType:
            fread( &SurfFile, 1, sizeof( SurfFile), Fptr);
                     surTransferSurfFile2SurfParms(
                          &SurfFile, SurfParms );
                     iSize = SurfParms->ImgSpec.iXDim *
                          SurfParms->ImgSpec.iYDim;
                     if( iSize < MAX_ARRAY_SIZE)
                          {
                          fread( SurfParms->DataArray, 1,
                          iSize, Fptr);
            fread( SurfParms->Intensity, 1, iSize, Fptr);
            rt = TRUE;
            }
                     else
                     SurfParms->ImgSpec.iXDim = 0;
                     break;
                case eSurfDataType:
                     rt = surReadAsciiSurfaceFile(
                     SurfParms,Fptr);
                     break;
         }
            return rt;
      }
/*****************************************************
 * read olf ascii surface file
 ****************************************************
 */
static BOOL  surReadAsciiSurfaceFile(SURFACE_WIN_PARMS
      *SurfParms, FILE *Fptr)
      {
      IMAGE_DATA_SPEC     *ImgSpec; /* filename,dim,date */
```

```
char  chBuff[MAX_TEXT_LINE];
char  chTitle[MAX_TEXT_LINE], chValue[MAX_TEXT_LINE];
float   fValue;
BOOL  rt = FALSE;
ImgSpec = &SurfParms->ImgSpec;
ImgSpec->iXDim = 0;
ImgSpec->iYDim = 0;
ImgSpec->iZDim = 0;
ImgSpec->fXRes  = 40.0;
ImgSpec->fYRes  = 40.0;
ImgSpec->fZRes  = 25.0;
ImgSpec->DataTime = 0;
while ( fi_GetTitleAndValueString( Fptr, chTitle,
     chValue) == TRUE)
     {
     fValue = atof( chValue);
     if( strcmp( chTitle, FILE_COMMENT1) == 0)
          {
          }
     else if( strcmp( chTitle, FILE_COMMENT2) == 0)
          {
          }
     else if( strcmp( chTitle, FILE_DIM_X) == 0)
          {
          ImgSpec->iXDim = (int)fValue;
          }
     else if( strcmp( chTitle, FILE_DIM_Y) == 0)
          {
          ImgSpec->iYDim = (int)fValue;
          }
     else if( strcmp( chTitle, FILE_DIM_Z) == 0)
          {
          ImgSpec->iZDim = (int)fValue;
          }
     else if( strcmp( chTitle, FILE_RES_X) == 0)
          {
          ImgSpec->fXRes = fValue;
          }
     else if( strcmp( chTitle, FILE_RES_Y) == 0)
          {
     ImgSpec->fYRes = fValue;
          }
     else if( strcmp( chTitle, FILE_RES_Z) == 0)
          {
          ImgSpec->fZRes = fValue;
          }
     else if( strcmp( chTitle, FILE_GX_THRESHOLD) ==
     0)
          {
          SurfParms->Threshold     =(int)fValue;
          SurfParms->ActualThres = (int)fValue;
          }
     else if( strcmp( chTitle, FILE_GX_ENCHANCED) ==
```

```
            0)
                 {
                 SurfParms->bEnhanced= (int)fValue;
                 SurfParms->bEnhance = (int)fValue;
                 }
            else if( strcmp( chTitle, FILE_GX_ZFITTED) == 0)
                 {
                 SurfParms->bZCurFit =(int)fValue;
                 SurfParms->bZFitted =(int)fValue;
                 }
            /*
            else if( strcmp( chTitle, FILE_GX_AZIMUTH) == 0)
           {
           SurfParms->Azimuth = (int)fValue;
           }
        else if( strcmp( chTitle, FILE_GX_ROTATE) == 0)
           {
           SurfParms->Rotate = (int)fValue;
           }
            */
            else if( strcmp( chTitle, FILE_GX_VIEW_DIST)
            ==0)
                 {
                 SurfParms->ZoomSpec[SurfParms->ZoomIndex].D
                      istance = (int)fValue;
                 }
            else if( strcmp( chTitle, FILE_GX_ZVALUES) ==0)
                 {
                 if( (int)fValue <  MAX_ARRAY_SIZE )
                      {
                      fread( SurfParms->DataArray, 1,
                           (int)fValue, Fptr);
                      rt = TRUE;
                      }
                 }
            else if( strcmp( chTitle, FILE_GX_IVALUES) ==0)
                 {
                 if( (int)fValue <  MAX_ARRAY_SIZE )
            {
                      fread( SurfParms->Intensity, 1,
                           (int)fValue, Fptr);
                      }
                 }
            }
      if( (ImgSpec->iXDim * ImgSpec->iYDim) >
      MAX_ARRAY_SIZE )
            {
            ImgSpec->iXDim =0;
            rt = FALSE;
            }
      return rt;
      }
/**************************************************
```

- 30 -

```
 * generate surface based on simple maximum intensity
 * for volume data already in ram:
 *   iZStart specifies computation starts at iZStart.
*********************************************************
 */
extern  BOOL sur_GenerateNonFittedSurface(FILE
*Fptr,VOLUME_DATA *VolData ,
                     int XDim, int YDim, int ZDim,
                    SURFACE_WIN_PARMS *SurfParms, int
iZStart)
     {
     BYTE *bPtr, *IPtr;
     BYTE  *DaArray;       /* intensity, maximum   */
     BYTE  *MinArray;      /* intensity, minimum */
     BYTE  *NeArray;       /* intensity of current slice
     */
     BYTE  *ZArray, *PtrZ, ZVal; /* Z corresponding to max
     intensity */
     int   jj, ZIndex, iSize, Threshold, NumRead;
     BOOL  rt = FALSE, bDone = FALSE;

     bPtr      = SurfParms->DataArray;
     IPtr      = SurfParms->Intensity;
     Threshold      = SurfParms->Threshold;
     iSize = XDim * YDim;
     DaArray   = (BYTE *)XtMalloc ( iSize );
     ZArray    = (BYTE *)XtMalloc ( iSize );
     NeArray   = (BYTE *)XtMalloc ( iSize );
     MinArray  = (BYTE *)XtMalloc ( iSize);
     if( DaArray &&  ZArray && NeArray && MinArray && ZDim
     )
          {
          rt = TRUE;
          NumRead = iSize;
          if( Fptr)
               {
               for( ZVal = 0; ZVal < iZStart && NumRead ==
                    iSize; ZVal++)
               NumRead =  fread( NeArray, 1, iSize, Fptr);
               }
          for( ZVal = iZStart, ZIndex = iZStart;
          ZIndex < ZDim && NumRead == iSize; ZIndex++,
          ZVal++)
               {
               if( Fptr)
          NumRead =  fread( NeArray, 1, iSize, Fptr);
               else
               memcpy( NeArray, &(VolData->VolByte[ZIndex
                    * iSize]), iSize);
               if(  NumRead == iSize )
                    surComputeMax( DaArray, NeArray,
                         ZArray, MinArray, iSize, ZVal,
                         iZStart );
```

```
                }
            if( Fptr)
                {
                if( NumRead == iSize )
                    NumRead =  fread( NeArray, 1, iSize,
                    Fptr);
                sur_FillPCVolTailer( &SurfParms->ImgSpec,
                    NeArray, NumRead);
                }
/* threshold turned off, 9/1/92
      surDoThreshold( ZArray, DaArray, MinArray, iSize,
Threshold);
*/
            memcpy( bPtr,  ZArray, iSize);
            memcpy( IPtr, DaArray, iSize);
            }
        if( DaArray  ) XtFree(DaArray  );
        if( ZArray   ) XtFree( ZArray  );
        if( NeArray  ) XtFree(NeArray  );
        if( MinArray ) XtFree(MinArray );
        if( Fptr == NULL)
            surPeakFit( VolData, XDim,YDim,ZDim,SurfParms);
        return (rt);
        }

/*****************************************************
 * extract info from end of PC volume data
 * LocoTime = localtime( &ImgSpec->DataTime);
 * fprintf( stderr, "19%d,%d,%d,", LocoTime->tm_year,
 *        LocoTime->tm_mon, LocoTime->tm_mday);
 ****************************************************
 */
extern BOOL sur_FillPCVolTailer( IMAGE_DATA_SPEC *ImgSpec,
        BYTE *BPtr, int NumByte)
        {
        BOOL rt = FALSE;
        int       iTime;
        short     S1, S2;
        struct tm *LocoTime;
        UV_CONFIG           *pCfg    = cfg_GetLockRdConfig();

        if( NumByte == PC_VOL_TAILER_LENG )
            {
            iTime = * ( (int *)(&BPtr[0]) );
            ImgSpec->DataTime = fi_IntelIntSwap(iTime);
            S1 = * ( (short *)(&BPtr[4]) );
            S1 = fi_IntelShortSwap(S1);
            if ( S1 < 1)  S1= 1;
            ImgSpec->fZRes     = pCfg->ConfocalSpec.ZResol *
            S1;

            S1 = * ( (short *)(&BPtr[6]) );
            S1 = fi_IntelShortSwap(S1);
```

```
            if ( S1 < 1)  S1= 1;
            ImgSpec->fXRes     = 40 *4 / S1;
            ImgSpec->fYRes     = 40 *4 / S1;

            S1 = * ( (short *)(&BPtr[8]) );
            S1 = fi_IntelShortSwap(S1);
            ImgSpec->ScanMode = S1;

            rt = TRUE;
            }
        }


/*******************************************************
 * compute and update the Z,I array from new data slice
 *******************************************************
 */
static BOOL surComputeMax( BYTE *PtrI, BYTE *PtrN, BYTE
      *PtrZ, BYTE *PtrMin, int iSize, BYTE ZVal, int
      iZStart)
      {
      int j;

      if( ZVal == iZStart)
            {
            memcpy( PtrI,   PtrN, iSize);      /* memcpy(
                  PtrMin, PtrN, iSize);    */

            for(  j = 0; j< iSize; j++)
                  *PtrZ++ = ZVal;
            }
      else
            {
            for( j = 0; j< iSize; j++)
                  {
                  if( (*PtrI + 1) < *PtrN )
                        {
                        *PtrI   = *PtrN;
                        *PtrZ   =   ZVal;
                        }
                  PtrZ  ++;
                  PtrN  ++;
                  PtrI  ++;
                  }
            }
      return TRUE;
      }
extern int sur_SmoothSurface( int iXDim, int iYDim, BYTE
      *bPtr)
      {
      BYTE *bLine0, *bLine1, *bLine2;
      BYTE *bFLine;
      BYTE *bFBuff;
```

```
int iX, iY, iEnd, iSize, rt = FALSE;
iSize =   iXDim * iYDim;
bFBuff = (BYTE *)XtMalloc( iSize * sizeof(BYTE) );
if( bFBuff)
     {
     for( iY =0; iY < iYDim ; iY++)
          {
          bFLine = &(bFBuff[ iY * iXDim]);
          Get3Lines( bPtr, &bLine0, &bLine1, &bLine2,
               iXDim, iYDim, iY);

          bFLine[0] = ( (int)bLine0[0] + bLine0[1] +
                        bLine1[0] + bLine1[1] +
                        bLine2[0] + bLine2[1]   )/6;

          iEnd = iXDim-1;
          bFLine[iEnd] = (  (int)bLine0[iEnd] +
               bLine0[iEnd-1] + bLine1[iEnd] +
               bLine1[iEnd-1] + bLine2[iEnd] +
               bLine2[iEnd-1]   )/6;

          for ( iX =1; iX< iEnd  ; iX++)
               {
               bFLine[iX] =( (int)bLine0[iX-1] +
                    bLine0[iX] + bLine0[iX+1] +
                    bLine1[iX-1] +((int)bLine1[iX] *
                    7) + bLine1[iX+1] + bLine2[iX-1]
                    + bLine2[iX] + bLine2[iX+1] ) /
                    15;
               }
          }
     memcpy( bPtr, bFBuff, iSize);
     XtFree( bFBuff);
     rt = TRUE;
     }
return( rt);
}

/*****************************************
 * for a 3x3 filter we need the 3lines
 *
 *****************************************
 */
static int Get3Lines( BYTE *bBuff, BYTE **bLine0, BYTE
     **bLine1,BYTE **bLine2, int iX, int iY, int iYIndex )
     {
     int iYIndex_1, iYIndex1;

     iYIndex_1 = iYIndex -1;
     if( iYIndex_1 < 0) iYIndex_1 = 0;
     iYIndex1  = iYIndex +1;
     if( iYIndex1 >= iY) iYIndex1 = iY -1;
```

```
        *bLine0 =  &(bBuff[ iYIndex_1 * iX]);
        *bLine1 =  &(bBuff[ iYIndex   * iX]);
        *bLine2 =  &(bBuff[ iYIndex1  * iX]);
        return 1;
        }
/*********************************************************
****************
 * find the normal vector from the gradient  of current
and last point
 * Data array is assumed to be drawn as ( see gx.c )
 *
 * |       |       |       |       |
 * 2 ----- 4 ----- 6 ----- 8 ----- 10 --- 12   next line
 * | \  B  | \  D  | \  F  | \  H  |  ...
 * |   \   |   \   |   \   |   \   |  ...
 * | A   \ | C   \ | E   \ | G   \ |
 * 1 ----- 3 ----- 5 ----- 7 ------ 9 --- 11   current
line
 * ie:
 *  loop:
 *     n( normalVector at 1)
 *     v(1)
 *     n( normal vector at 2)
 *     v(2)
 *  endloop
 *
 * normal vector is the cross product of the 2 delta
vector: Dzx, Dzy
 * ie n() = (1,0,dzx ) x ( 0,1,dzy)
 *  n1   n2  n3          n1    n2    n3
 *  x1   x2  x3    =      1    0    dzx
 *  y1   y2  y3           0    1    dzy
 *
 * n0 = x2 * y3 - x3*y2 =  - dzx;
 * n1 = x3 * y1 - x1*y3 =  - dzy;
 * n2 = x1*  y2 - x2*y1 =    1 ;
 *
 ******************************************************
 */
/*******************************************************
 * there are two normal vector for each point, because
there are 2 triangles
 * per data point, ie for Data point dj,k
 *
 *  Dj+1,k-1 ----- Dj+1,k
 *    |   \            |
 *   /|\   \   B       |
 *    | A    \         |
 *    |        \       |
 *    |          \     |
 *  Dj,k-1 ----->- Dj,k    DataPtr2
 *
 * GetNormal() calc the normal vector for A,
```

```
 * GetNormal2() calx  normal vector for B

*********************************************************
 */
static int GetNormal( float *n, BYTE *DataArray, BYTE
     *DataPtr2, int iX)
     {
     float fDx, fDzx, fDzy, fSize;
     if( iX==0)
          {
          iX=1;
          fDzx = 0;
          }
     else
          fDzx = (float)DataPtr2[iX ] - (float)DataPtr2[iX
          -1];
     fDzy =  (float)DataPtr2[iX -1] - (float)DataArray[iX
          -1];

     fSize =  sqrt( 1 + fDzx * fDzx + fDzy * fDzy);
     n[2] =      1 / fSize;
     n[0] =  -fDzx * n[2];
     n[1] =  fDzy * n[2];

     return TRUE;
     }

/*********************************************
 *
 *********************************************************
 */
static int GetNormal2( float *n, BYTE *DataArray, BYTE
     *DataPtr2, int iX)
     {
     float fDx, fDzx, fDzy, fSize;

     if( iX==0)
          fDzx =0;
     else
          fDzx = (float)DataArray[iX] -
               (float)DataArray[iX -1 ];
     fDzy =  (float)DataPtr2[iX ] - (float)DataArray[iX]
     ;
     fSize =  sqrt( 1 + fDzx * fDzx + fDzy * fDzy);
     n[2] =      1 / fSize;
     n[0] =  -fDzx * n[2];
     n[1] =   fDzy * n[2];

     return TRUE;
     }

/*************************************************
```

```
 * fill normal array, extra row for the front face
 *
 ***************************************************
 */
extern int  sur_FillNormalArray( BYTE *DataArray,
     FLOAT_VECTOR *NormalArray, int iXDim, int iYDim)
     {
     FLOAT_VECTOR *fvNPtr, *fvTmpNPtr;
     BYTE    *DataPtr, *DataPtr2;
     BYTE    *EmptyRow;
     int     j,iX, iY;
     EmptyRow = (BYTE *)XtMalloc (MAX_LINE_LENG);
     for( j=0, DataPtr = EmptyRow; j < MAX_LINE_LENG; j++)
          *DataPtr++ = 0;
     for (iY = -1;  iY < iYDim; iY++ )
          {
/* extra one row to mask the front*/
          fvNPtr   = &NormalArray[ (iY+1) * (iXDim +
          iXDim)];
          if(iY >= (iYDim -1) )
               {
               for (iX=0; iX < (iXDim +iXDim); iX++)
                    memcpy( fvNPtr[iX].faxis,
                    fNormalFront, sizeof( fNormalFront) );
               }
          else
               {
               if( iY < 0)
                    {
                    for (iX=0; iX < (iXDim +iXDim); iX++)
                         memcpy( fvNPtr[iX].faxis,
                              fNormalBack,
                              sizeof(fNormalBack) );
/*
            DataPtr  = EmptyRow;
            DataPtr2 = DataArray;
*/
                    }
               else
                    {
                    DataPtr  =  &DataArray[iY * iXDim];

                    DataPtr2 =  &DataArray[ (iY +1) *
                    iXDim ] ;
                    memcpy( fvNPtr++, fNormalLeft, sizeof(
                         FLOAT_VECTOR ) );
                    memcpy( fvNPtr++, fNormalLeft, sizeof(
                         FLOAT_VECTOR ) );

                    for (iX=1; iX < (iXDim ); iX++)
                         {
                         GetNormal2( fvNPtr->faxis,
                              DataPtr, DataPtr2, iX );
```

```
                                fvNPtr++;
                                GetNormal( fvNPtr->faxis,
                                     DataPtr, DataPtr2, iX );
                                fvNPtr++;
                                }
                            }
                        }
                    }
                    XtFree( EmptyRow);
                    return (TRUE);
            }

/*********************************************************
 * transfer binary surface file format to surface
parameter

*********************************************************
 */
static BOOL surTransferSurfFile2SurfParms(
        BINARY_SURFACE_FILE *SurfFile, SURFACE_WIN_PARMS
        *SurfParms )
        {
        WIN_ZOOM_SPEC *ZSpec;
        BOOL rt = FALSE;
        if( SurfFile && SurfParms )
                {
                ZSpec = &(SurfParms->ZoomSpec[
                SurfParms->ZoomIndex]);
                SurfParms->ImgSpec.iXDim     = SurfFile->iXDim ;
                SurfParms->ImgSpec.iYDim     = SurfFile->iYDim ;
                SurfParms->ImgSpec.iZDim     = SurfFile->iZDim ;
                SurfParms->ImgSpec.fXRes     = SurfFile->fXRes ;
                SurfParms->ImgSpec.fYRes     = SurfFile->fYRes ;
                SurfParms->ImgSpec.fZRes     = SurfFile->fZRes ;
                SurfParms->ImgSpec.DataTime =
                SurfFile->DataTime;
/*
         SurfParms->Azimuth         = SurfFile->iAzimuth;
         SurfParms->Rotate          = SurfFile->iRotate;
*/
                ZSpec->Distance       = SurfFile->iViewDist;
                ZSpec->XLeft          = SurfFile->iZoomLeft;
                ZSpec->YBot           = SurfFile->iZoomBot ;
                SurfParms->YStart     = SurfFile->iDispYEnd;
                rt = TRUE;
                }
        return  rt;
        }

/*********************************************************
 *least square curve fit to a quadratic form:
 * y = a(x*x) +bx + c
 * algorithm  to solve for a,b,c in the least sq sense
```

```
*
* | y0 |       | (x0*X0)   x0  1 |
* | y1 |       | (x1*X1)   x1  1 |     | a |
* | y2 |   =   | (x2*X2)   x2  1 |  *  | b |
* | y3 |       | (x3*X3)   x3  1 |     | c |
* | y4 |       | (x4*X4)   x4  1 |
* | y5 |       | (x5*X5)   x5  1 |
* | y6 |       | (x6*X6)   x6  1 |
*
* | y0 |       | 9  -3  1 |
* | y1 |       | 4  -2  1 |
* | y2 |       | 1  -1  1 |     | a |
* | y3 |   =   | 0   0  1 |  *  | b |      for steps of 1 and
                                             arround center
* | y4 |       | 1   1  1 |     | c |    ie: x=-2,-1,-,1,2
* | y5 |       | 4   2  1 |
* | y6 |       | 9   3  1 |
* multiply the transpol to both side
*                                | y0 |
*                                | y1 |
* | 9  4  1  0  1  4  9 |        | y2 |      | 196  0  28 |    |
a |
* |-3 -2 -1  0  1  2  3 |  *     | y3 |  =   | 0 28   0 |  *  | b |
* | 1  1  1  1  1  1  1 |        | y4 |      | 28  0  7 |     | c |
*                                | y5 |
*                                | y6 |
*
* multiply the inverts to both side
*                                                  | y0 |
*                                                  | y1 |
* 1      | 1  0 -4|  | 9 4 1  0 1 4 9 |           | y2 |       | a |
* --- *  | 0  3  0|*|-3 -2 -1 0 1 2 3 |     *     | y3 |   =   | b |
* 84     | -4 0 28|  | 1 1 1 1 1 1 1 |           | y4 |       | c |
*                                                                |
y5 |
*                                                                |
y6 |
*
*                                          | y0 |
*                                          | y1 |
*  1     |  5  0 -3 -4 -3  0  5 |          | y2 |       | a |
* --- *  | -9 -6 -3  0  3  6  9 |     *    | y3 |   =   | b |
* 84     | -8 12 24 28 24 12 -8 |          | y4 |       | c |
*                                          | y5 |
*                                          | y6 |
*
* input: dataarray of the 7 slices
*                        2
* for the equation y = k(x-x0)   + y0
* only interested in the maximum( x0)
* a = k
* b = -2kX0
*        b
```

```
 * X0 =  ---
 *       -2a
 * if a < minium, X0 assume to be -infinite
 * fitted data stored in bPtr2
 ***********************************************************
 */

/***********************************
 * peak fit: assumes volume is there
 ***********************************
 */
#define FIT_SIZE 7
static BOOL surPeakFit( VOLUME_DATA *VolData , int XDim,
     int YDim, int ZDim, SURFACE_WIN_PARMS *SurfParms)
     {
     int iX, iY, iZ, iZSlice, iZZ, iFrame, FOffset;
     int  VPtr[FIT_SIZE];
     int  a, b;

     iFrame = XDim * YDim;
     for( iY = 0; iY < YDim; iY++)
          {
          for( iX= 0; iX < XDim; iX++)
               {
               FOffset = iY * XDim + iX;
          iZSlice =  SurfParms->DataArray[FOffset];
               for( iZ = -3; iZ < 4; iZ++)
                    {
                    iZZ = iZSlice + (iZ * 2);
                    if( iZZ < 0)   iZZ= 0;
                    if( iZZ > (ZDim -2))     iZZ = ZDim-2;
                    VPtr[iZ + 3] = VolData->VolByte[  iZZ
                         *   iFrame + FOffset] +
                         VolData->VolByte[(iZZ +1) *iFrame
                         + FOffset];
                    }
               a = (5 * VPtr[0])  - (3 * VPtr[2]) - (4*
                    VPtr[3]) + (5 * VPtr[6])  - (3 *
                    VPtr[4]);
               b = (-9 *VPtr[0])  - (6 *VPtr[1]) -
                    (3*VPtr[2]) + ( 9 *VPtr[6])  + (6
                    *VPtr[5]) + (3*VPtr[4]);
               if( a < 0)
                    {
                    b = -b  / a;
                    if( b < -6) b = -7;
                    if( b >  6) b =  7;
                    b += iZSlice;
                    if( b < 0)     b =0;
                    if( b > 255) b = 255;
                    SurfParms->DataArray[FOffset] = b;
                    }
               }
```

```
        }
    return TRUE;
    }
/*****************************************************
 * compute and do the threholding on Z I  array
 *****************************************************
 */
static BOOL surDoThreshold( BYTE *PtrZ, BYTE *PtrN, BYTE
    *PtrMin, int iSize, int Threshold)
    {
    int j;
    for( j=0; j< iSize; j++, PtrZ++, PtrN++, PtrMin++)
        {
        if( (*PtrN < 128) &&  (*PtrN - *PtrMin) <
        Threshold )
            {
            *PtrZ = 0;
            *PtrN = 0;
            }
        }
    return TRUE;
}
```

I claim:

1. A method for constructing an image of a surface from a volumetric set of signals representing data value numbers, the volumetric set described by a Cartesian coordinate system having X, Y, and Z axes such that each number has a unique location, the volumetric set comprising at least one linear set of signals representing data value numbers arranged parallel to the Z axis, the method comprising the steps of:

generating, for each linear set of signals, a first signal representing a maximum data value number and a second signal representing a location of the maximum data value number, thereby producing a set of signals representing maximum data value numbers and a set of signals representing maximum-number locations, the step of generating comprising the steps of:

comparing a third signal in the linear set to a fourth signal in the linear set to determine which of the third and fourth signals represents a greater data value number;

storing the one of said third and fourth signals representing the greater data value number as said first signal representing a maximum number for the linear set and storing the location associated with the one of said third and fourth signals representing the greater data value number as said second signal representing a maximum-number location for the linear set; and for each signal in the linear set other than the third and fourth signals, comparing the signal to the first signal to determine which of the signal and the first signal represents a greater data value number;

storing the one of said signal and said first signal as the new first signal and storing the signal representing the one of said signal and said first signal as said second signal; and creating the image using the set of signals representing maximum data value numbers and the set of signals representing maximum-number locations.

2. A method as in claim 1, wherein the image is a three-dimensional display of the surface.

3. A method as in claim 1, wherein each of the numbers represents the intensity of light reflected in a particular direction from a point on or near the surface.

4. A method as in claim 3, wherein the reflected light is sensed by a confocal laser imaging system.

5. A method as in claim 3, wherein the surface is the surface of a semiconductor wafer.

6. A method as in claim 1, further comprising, for each linear set, the step of performing a least squares curve fit to obtain a modified maximum data value number for the linear set.

7. A method as in claim 6, wherein each least squares curve fit to obtain a modified maximum data value number is performed using (i) the signal representing the maximum number of the linear set, (ii) a first plurality of actual or dummy numbers adjacent to the location of the signal representing the maximum number and in the linear set, and (iii) a second plurality of actual or dummy numbers adjacent to the location of the maximum data value number and in the linear set.

8. A method as in claim 1, further comprising the step of filtering each of the maximum data value numbers to reduce the effect of noise on the image.

9. A method as in claim 8, wherein the step of filtering further comprises performing a two-dimensional convolution with a 3 by 3 operator.

* * * * *